United States Patent [19]

Van Geenen

[11] 3,862,481
[45] Jan. 28, 1975

[54] METHOD OF MANUFACTURING TUBES PROVIDED WITH LONGITUDINAL GROOVES IN INNER WALL AND/OR OUTER WALL, AND TUBES MANUFACTURED BY THIS METHOD

[75] Inventor: Johannes Van Geenen, Emmasingel, Eindhoven, Netherlands

[73] Assignee: U.S. Philips Corporation, New York, N.Y.

[22] Filed: Sept. 26, 1973

[21] Appl. No.: 401,122

[30] Foreign Application Priority Data
Oct. 14, 1972 Netherlands .................. 7213941

[52] U.S. Cl. .............................. 29/157.3 R, 29/477
[51] Int. Cl. ....................... B21d 53/02, B23p 15/26
[58] Field of Search ......... 29/157.3 R, 477; 165/105

[56] References Cited
UNITED STATES PATENTS
1,954,532  4/1934  Mahoney ........................ 29/477 X
3,305,005  2/1967  Grover et al. ..................... 165/105
3,402,767  9/1968  Bohdansky et al. ............... 165/105
3,811,496  5/1974  Asselman et al. ........ 29/157.3 R X FOREIGN PATENTS OR APPLICATIONS
375,434  6/1930  Great Britain ....................... 29/477

Primary Examiner—C. W. Lanham
Assistant Examiner—D. C. Reiley, III
Attorney, Agent, or Firm—Frank R. Trifari; J. David Dainow

[57] ABSTRACT

A method of manufacturing tubes having longitudinal grooves in the inner wall or outer wall, by forming a plurality of helical grooves of the same pitch and of the same direction in the grooved wall of an initially round tube, then cutting the tube open above one of said helical grooves, then unwinding the cut tube to form a flat band with said helically cut grooves now being longitudinal grooves, then folding said band into a round tube about an axis parallel to said longitudinal grooves and joining adjacent edges of said band.

5 Claims, 7 Drawing Figures

PATENTED JAN 28 1975　　　　　　　　3,862,481

METHOD OF MANUFACTURING TUBES PROVIDED WITH LONGITUDINAL GROOVES IN INNER WALL AND/OR OUTER WALL, AND TUBES MANUFACTURED BY THIS METHOD

BACKGROUND OF THE INVENTION

The invention relates to a tube provided with longitudinal grooves in its inner wall and/or outer wall, and also relates to a method of manufacturing such tubes. Tubes of this kind are notably used in the heat technology and in cryogenic techniques for heat transfer purposes. Tubes having an inner wall provided with capillary grooves in the axial direction are used as heat pipes.

A heat pipe is a heat transport device which is formed by a reservoir in which a small quantity of heat transport medium, for example, sodium is present which evaporates on one side from a reservoir wall by taking up heat from a heat source, and which on the other side gives off heat to another reservoir wall while changing over from the vapour to the liquid phase.

Using such a heat pipe, large quantities of heat can be transported without temperature drop and without a pumping device or other moving parte being necessary. Condensed heat transport medium can be returned to the wall where evaporation takes place by gravity. However, the heat pipe is often provided with a capillary structure which connects the condensation wall to the evaporation wall and through which condensate is returned to the evaporation wall by capillary action under all circumstances. The capillary structure can consist, for example, of gauze layers, porous ceramic material, capillary grooves in the reservoir wall etc., or of combinations thereof.

Heat pipes provided with capillary grooves in the axial direction for the return of condensate are known, for example, from U.S. Pat. Nos. 3,402,767 and 3,598,177. Tubes whose outer wall is provided with capillary grooves in the axial direction are used as inserts for heat pipes (U.S. Pat. No. 3,305,005). Finally, in heat exchangers tubes are used whose inner wall and/or outer wall is provided with axial grooves which often do not have capillary dimensions but which serve exclusively to increase the heat transfer surface areas between the two heat-exchanging media.

According to a method of manufacturing heat pipes having capillary longitudinal grooves in the inner wall which is known from Luxemburg Pat. No. 59,904, parallel grooves are provided in a flat band. This is effected by way of a chipping operation such as milling, planing and sawing or by profile rolling. The band is subsequently rounded to form a tube, and the longitudinal seam is joined by welding. The tube can have, for example, a round, a rectangular or a polygonal section.

A major drawback of milling, planing and sawing is that only flat bands of limited dimensions can be handled on the milling, planing and sawing machine. This means that according to this method only tubes of limited length can be manufactured, while for a variety of applications, tubes having a length of a few metres are often desired. Moreover, during planing and sawing the risk exists that while a groove is being made an adjacent groove will be deformed by material displacement; such deformation is intolerable, particularly for heat pipes where the transport of condensed heat transport medium is effected through the capillary grooves.

Even though profile rolling enables long bands to be provided with grooves, there is a first drawback, particularly in the case of thin bands, in that the rolled bands have a high dimensional inaccuracy as regards the groove dimensions and the distance between grooves. The roll does not produce a straight band with straight grooves, but a winding one. Rolling has a number of other drawbacks. The band width is limited by the width of the roller. The groove profile, the number of grooves and the distance between grooves cannot be readily varied because they are fixed for the relevant roller. A change of these parameters, consequently, necessitates the exchange of rollers or the use of a plurality of rolls, which makes the manufacturing process time-consuming and expensive. Moreover, not all desired groove profiles can be realized by rolling. In the manufacture of tubes whose outer wall is provided with longitudinal grooves having a rectangular profile it is necessary, in view of the subsequent bending of the flat band, to provide this band with grooves whose width increases as the depth increases ("dovetail" profile). This cannot be realized by rolling.

The present invention has for its object to provide a method by which the described drawbacks are eliminated.

SUMMARY OF THE NEW INVENTION

The method according to the invention is characterized in that the flat band with parallel grooves is formed by providing in the outer wall and/or inner wall of a tubular element having a circular cross-section, a number of helical grooves of the same pitch and extending in the same direction, the tubular element being subsequently opened according to a helix of the same direction and pitch as the grooves, the helically wound band thus obtained being subsequently unwound.

It is thus achieved that from a basic tubular element of limited length and comparatively large diameter, a long band comprising parallel grooves extending in the longitudinal direction on one or on both sides is obtained, this band resulting, after rounding and sealing of the longitudinal seam, in a tube of large length and comparatively small diameter having longitudinal grooves in the inner wall and/or outer wall.

Because a short tubular element is used as the basic element, it can be readily clamped on a machine tool on which it can be accurately machined without deformation, due to the strength of this mechanically strong element resulting from its tubular shape. It is thus possible to provide grooves of the desired profile which satisfy the highest dimensional accuracy requirements as far as dimensions and parallelity with respect to each other are concerned.

A large degree of freedom exists as regards the choice of the length and the diametrical dimensions of the tube to be formed from a tubular element, and as regards the number of grooves to be provided in this tube, their profile, the dimensions and the distance between grooves.

A tube of this kind can contain longitudinal grooves over a part of its inner wall and/or outer wall circumference or over the entire wall circumference. Longitudinal grooves in the inner wall can deviate from longitudinal grooves in the outer wall of the tube as regards number, profile, dimensions and distance between grooves. The grooves can extend over the entire tube length or over one or more parts thereof. It is even possible that, viewed in the wall circumference direction and/or in the longitudinal direction of the tube, one kind of groove changes over into another kind of groove.

The grooves can be provided, for example, by etching. In a preferred embodiment of the method according to the invention, the grooves are provided by a cutting operation such as lathing and grinding. A lathe is extremely suitable for providing grooves in tubular elements of non-ferrous metals and metal alloys, while a grinding machine is particularly suitable, for example, for cases where the tubular element is made of harder kinds of steel. However, the choice between lathing and grinding is dependent of the diameter of the tubular element. In both cases the replacement of the tool (cutter or grinding wheel) is a simple and also inexpensive matter, with the result that a change-over from the making of one kind of groove with associated groove distance to the making of another kind of groove can be readily made.

According to the invention it is advantageous to provide a number of grooves simultaneously, which results in a substantial saving of time. This can be realized, for example, by utilizing a plurality of single cutters or one or more multi-profiled cutters by means of which the inner wall and/or outer wall of the tubular element can be simultaneously treated. It is alternatively possible to achieve this by using a plurality of single grinding wheels or one or more profiled grinding wheels simultaneously on a grinding machine.

According to a further preferred embodiment of the method according to the invention, the tubular element is cut open at the area of a groove. Due to the helical groove, the wall thickness of the tubular element is minimum at this area, with the result that the element can be readily punctured via this groove, either starting from the groove itself or via the wall of the tubular element which is remote from the groove, or from both sides.

The invention furthermore relates to a tube which is provided with longitudinal grooves in inner and/or outer wall, the said tube being particularly suitable for heat pipes and heat exchangers. This tube is characterized in that it is manufactured according to the described method.

The invention will be described in detail with reference to an example and the drawing.

BRIEF DESCRIPTION OF THE DRAWINGS

FIG. 1b shows a fragmentary sectional view of grooves in the tube of FIG. 1a.

DESCRIPTION OF THE PREFERRED EMBODIMENT

For the manufacture of a long heat pipe having capillary longitudinal grooves in the inner wall, a tubular element of chromium-nickel steel having an outer diameter of 150 mm, an inner diameter of 148 mm and a length of 150 mm was used as the basic element.

On a lathe, the outer wall of this element was provided with grooves having a pitch equal to the outer circumference $\pi D$ (D = outer diameter) of the pipe to be manufactured, i.e., 15 grooves having a pitch of 15.7 mm (D = 5 mm). These grooves were arranged at the same distance from each other.

Figure 1A:
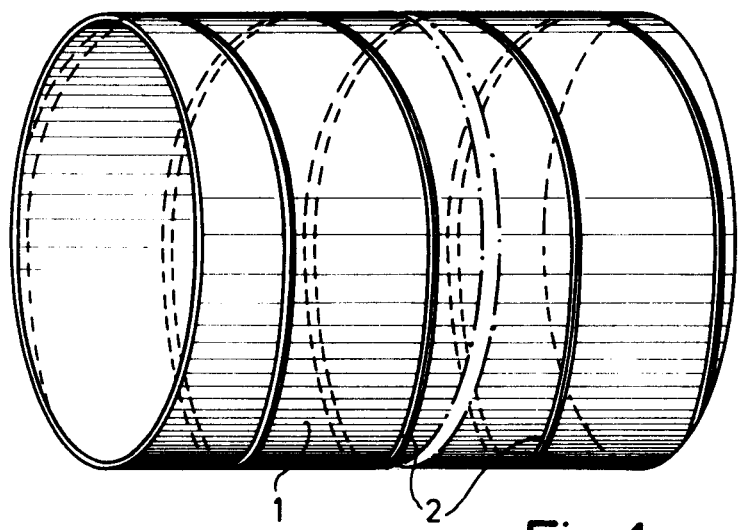
FIG. 1a shows a perspective view of a tubular element of this invention.
Figure 1B:
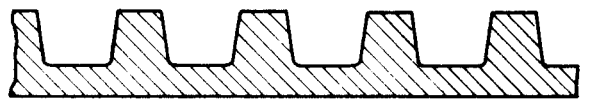

FIG. 1a shows the tubular element 1 in perspective, only one of the helical grooves 2 being shown for the sake of clarity. The grooves had a trapezoid profile such as is shown in detail for a few grooves in FIG. 1b. The groove depth and the smallest groove width (top width of the trapezium) amounted to 0.5 mm. The acute angle between the two upright legs of the trapezium amounted to 15°.

Figure 1C:
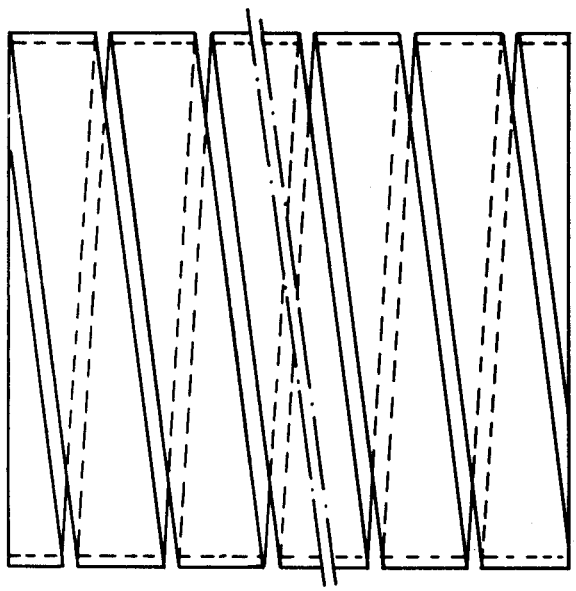
FIG. 1c shows a helically-grooved tube having one groove cut open to permit forming the tube into a flat band.

Subsequently, one of the grooves was cut open in its center, so that a helically wound band of approximately 9 turns was obtained as shown in FIG. 1c. When this band unwound, a flat band was having a length of approximately 4.5 meters was obtained, provided with parallel grooves in the longitudinal direction, i.e., 14 whole grooves and two half complementary grooves on the two longitudinal sides of the band. The band width was of course 15.7 mm, i.e., equal to the said pitch. After the rounding of the flat band about an axis, parallel to the grooves, towards the wall with the grooves, and after the connection of the two oppositely situated half grooves to each other, a pipe was obtained having a length of approximately 4.5 m, an outer diameter of 5 mm, an inner diameter of 3 mm, and provided with 15 capillary grooves having a rectangular profile, accurately to size, in the inner wall (groove width and depth both 0.5 mm).

Figure 2:
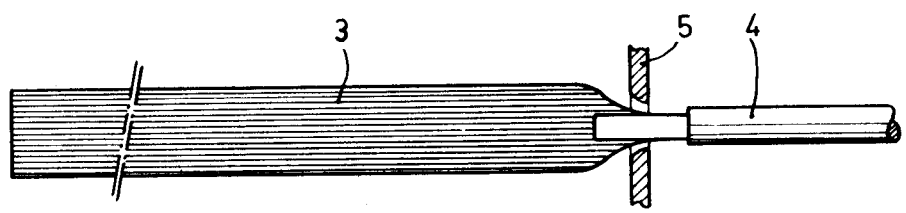
FIG. 2 shows an elevation view, partially in section, of a drawbar and drawing die.

The rounding of the band was effected by prebending one band end, by subsequently connecting this end to a draw bar and by subsequently drawing the band through three drawing dies of successively decreasing opening diameter (9.4, 7.4 and 5 mm, respectively). Immediately after passage of the last die, the longitudinal seam of the band which was now bent to form a pipe was welded by argon arc welding. Due to the use of the drawing dies, no further tools are required during welding for pressing together the wall portions to be joined by welding. FIG. 2 shows the pre-bent band 3 with the capillary longitudinal grooves connected to a drawbar 4 just before the band enters a drawing die 5.

Figure 3:
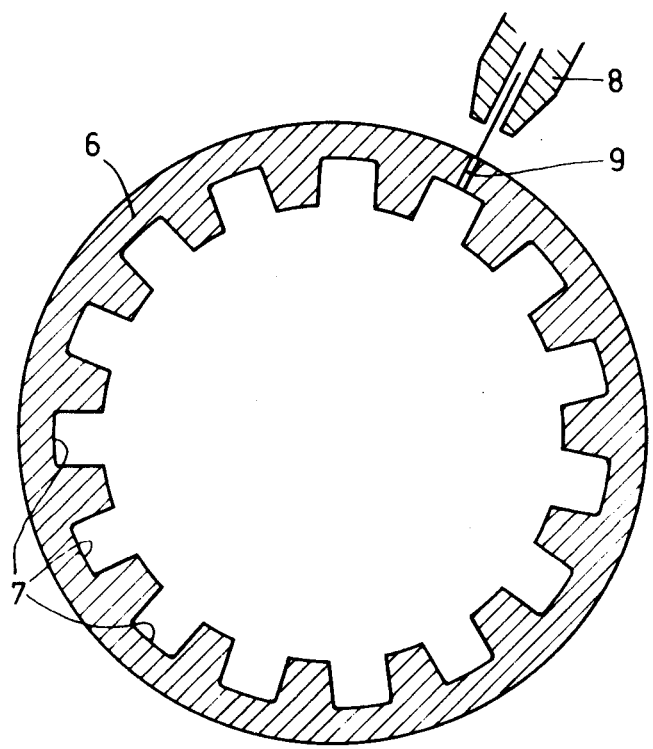
FIG. 3 is a sectional view of a pipe with capillary grooves.

FIG. 3 is a cross-sectional view of the pipe 6 with the capillary grooves 7 on the inner wall. The reference numeral 8 denotes a welding torch for welding the longitudinal seam 9. For obtaining a pipe having longitudinal grooves in the outer wall, the procedure can be the same as for the example shown. However, the rounding of the flat band must then be performed in reversed manner. Instead of providing the helical grooves in the outer wall of the tubular element, they can of course also be provided in the inner wall.

Figure 4:
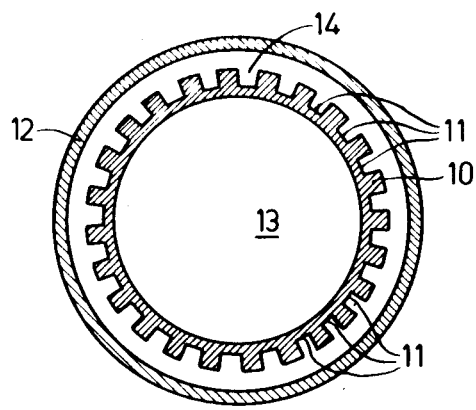
FIG. 4 is a sectional view of a pipe with capillary grooves surrounded by an outer tube.
Figure 5:
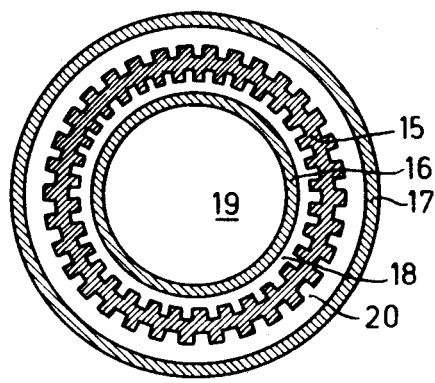
FIG. 5 is a sectional view of another embodiment of a pipe with capillary grooves and inner and outer pipes.

FIG. 4 is a cross-sectional view of a tube 10, having longitudinal grooves 11 in the outer wall, envelope by a second tube 12. The tubes together constitute a heat exchanger in which a medium flowing in central duct 13 can exchange heat with a medium flowing in annular duct 14. If helical grooves are provided in the inner as well as in the outer wall of a tubular basic element, a tube can be obtained as shown in the sectional view of FIG. 5, denoted by the reference numeral 15. Tube 15 is enveloped by tubes 16 and 17. Together they again constitute a heat exchanger. A medium flowing through annular duct 18 can exchange heat with a medium flowing through central duct 19 and annular duct 20.

It is to be noted that the use of the tubes obtained according to the described method is by no means restricted to heat pipes and heat exchangers. Instead of the pre-bending of one end and the drawing, the rounding of the flat band can alternatively be realized in a different manner, for example, by rolling in or by means of multiple tools. The longitudinal seam can be closed other than by welding. The rounded tube with longitudinal seam can be slid, for example, with a tight fit into an enveloping tube, and the assembly of the two tubes can subsequently be fed, for example, through a drawing die.

What is claimed is:

1. In a method of manufacturing tubes, particularly suitable for heat pipes and heat exchangers, each having a plurality of longitudinally extending grooves in the inner wall and/or outer wall, wherein a flat band having parallel grooves is bent about an axis parallel to the grooves so as to form a tube, the oppositely situated longitudinal sides being joined together, the improvement comprising forming the flat band having parallel grooves by providing in the outer wall and/or inner wall of a tubular element having a circular cross-section a number of helical grooves of the same pitch and extending in the same direction, subsequently cutting open the tubular element in order to form a helix of the same direction and pitch as the grooves, and then unwinding the helically wound band thus obtained.

2. In a method of manufacturing from a tubular element having inner and outer wall surfaces, a pipe which has longitudinally extending grooves in at least one of said inner and outer pipe wall surfaces, by carrying out the steps on said tubular element, comprising: forming in the tubular element a plurality of continuous helical grooves in at least one of said inner and outer wall surfaces thereof, cutting through said grooved wall along one of said continuous helical grooves thus forming a wound band, unwinding said band into a generally flat form with said uncut grooves now extending along the longitudinal axis of said band and with opposite longitudinal side edges of the band, forming said band about its longitudinal axis into said pipe, and joining said opposite side edges of the band, whereby a pipe having axial grooves is formed of substantially greater length than the length of the tubular element.

3. A method according to claim 2 wherein forming said helical grooves comprises machining same with a lathe or grinding wheel.

4. A method according to claim 2 wherein forming said band into said pipe comprises pre-bending one end of said band, inserting said end into a drawing die, drawing said band via said end thereof through said die for forming said pipe shape and decreasing the diameter thereof.

5. A method according to claim 2 wherein said grooves have width and depth of approximately 0.5 mm.

* * * * *